May 12, 1970     R. F. COLLINS     3,511,775

THIN LAYER CHROMATOGRAPHY METHOD AND APPARATUS

Filed Aug. 27, 1968

Inventor
Raymond Frederick Collins

By Cushman, Darby & Cushman

Attorneys

United States Patent Office 3,511,775
Patented May 12, 1970

3,511,775
THIN LAYER CHROMATOGRAPHY METHOD AND APPARATUS
Raymond Frederick Collins, Harold Wood, Essex, England, assignor to May & Baker Limited, Essex, England, a British company
Filed Aug. 27, 1968, Ser. No. 755,648
Claims priority, application Great Britain, Sept. 4, 1967, 40,357/67
Int. Cl. B01d *15/08*
U.S. Cl. 210—31                                14 Claims

ABSTRACT OF THE DISCLOSURE

Thin layer chromatographic plates are provided near one or both ends with a transverse groove filled with absorbent. Near the lower or origin end the groove serves to collect non-mobile debris and prevent it interfering with the process. Near the other end the groove acts as a sink to prevent premature saturation with solvent.

---

Figure 1:
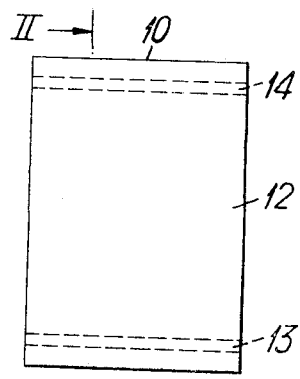

This invention relates to the use of thin layer chromatographic techniques for the separation and/or identification of the individual components of mixtures, and to chromatogaptic plates for use therein.

The standard method of thin layer chromatography makes use of a plate, e.g. of a synthetic resinous material or of glass, which carries a thin and uniform layer of a solid absorbent composition, usually consisting of silica or alumina gel and a binder. One suitable composition comprises silica gel as the absorbent and calcium sulphate as the binder. A solution of the mixture to be separated or identified is applied at one end of the plate (hereinafter referred to as the origin), and the component or components to be separated or identified are caused to travel up the plate by the flow of a suitable solvent or solvents. After a suitable time has elapsed further travel of the components or components is stopped by evaporating the solvent, if it has not ceased spontaneously as a result of saturation of the absorbent layer with the solvent.

While the above simple method gives very good results when applied to the simpler mixtures, it is often less satisfactory when applied to mixtures containing a substantial proportion of contaminating material which does not travel, or travels only a very short distance, during the operation. For example, when organic material such as macerated plant residues is being treated, the solution first obtained contains a fairly high proportion of "debris" and soluble products which are substantially immobile under the conditions employed, but which are found to interfere with the travel of the more mobile components which it is desired to separate or identify.

In addition, whether or not such contaminating material is present, it is sometimes found that the travel of the component or components ceases spontaneously as described above before an adequate separation has been achieved.

It is an object of the present invention to provide an improvement in the above process which shall reduce or substantially eliminate difficulties caused by the presence of such contaminating material or debris, by the premature cessation of solvent flows or by both.

It has been found that a chromatographic plate provided near one end with a transverse groove which is filled with the absorbent material may be used with advantage either by orientating the plate so that the groove lies at the origin, in which case the difficulties caused by the aforesaid contaminating material may be reduced or substantially eliminated, or by having the groove remote from the origin, which has the effect of delaying the cessation of solvent flow and thus improving the resolution of the plate. As will be apparent, by having a groove at each end of the plate the process may be improved in both ways at once.

In one aspect the invention consists in a thin layer chromatographic plate comprising a base plate which carries an absorbent layer, in which the base plate is provided near at least one end, and preferably near both ends, with a transverse groove having a curved and wholly concave peripheral surface, and in which the layer of absorbent completely fills the groove or grooves and covers the remaining surface of the base plate in the usual manner.

The width and depth of the groove or grooves is not critical, and may be adapted to the particular separation operation required. In most cases however, a width between 0.5 and 1.5 cm. and a depth between about 1 and 3 mm., will be found to be satisfactory. In the case of a groove at the origin it may generally be said that the greater the quantity of contaminant in the solution to be treated and the less its mobility in the developing solvent, the greater should be the volume of absorbent in the groove.

It is important that the groove, or at least the first groove when two are used, should be free from sharp corners or other features of shape, e.g. re-entrant angles which would promote the occurrence of dead spots and so interfere with the smooth and uniform flow of solvent through the absorbent material as a whole. It is for this reason that we use a curved and wholly concave groove. Generally speaking, a groove having the dimensions given above and a cylindrical or near cylindrical peripheral surface will be found to be both convenient and effective, but clearly many other curved surfaces will also be satisfactory.

It is believed that the groove at the origin, when present, operates as a sump in which, as a result of the increased volume of absorbent, the non-mobile or nearly non-mobile material or "debris" is wholly retained, while the more mobile material which is to be separated or identified passes beyond it. It is also believed that the difficulties and inefficiency experienced when no groove is used are caused by overloading the absorbent with an accumulation of the debris which, to a greater or less extent depending on the circumstances, interferes with the travel of the more mobile components.

A groove remote from the origin, on the other hand, acts as a sink for the developing solvent, which can therefore continue to flow until the whole volume of the absorbent material in the groove is saturated, thus improving the separation of the components.

The invention also includes the use of grooved plates as described above in conventional thin layer chromatographic operations. More particularly it includes a method of chromatographically separating or identifying a component or components in a solution containing also material which is not substantially mobile on a chromatographic plate, in which the solution is applied to a groove of a chromatographic plate as defined above, and a developing solvent or solvent mixture is caused to travel along the plate from the groove or from a line between the groove and the nearest end of the plate. The invention includes further a method of chromatographically separating or identifying a component or components in a solution in which the solution is applied to a chromatographic plate defined above, and having a groove remote from the origin, and a solvent or solvent mixture is applied to or below the origin and the chromatographic process is continued until a substantial quantity of solvent has entered the said groove. In either case the solvent of the solution is preferably evaporated before the developing solvent is applied.

The invention includes also a new technique, which can applied even when conventional plates are used, but ich is of particular advantage in connection with the ites of the invention. In this method the plate is first ld under conditions such that an applied (developing) vent (or solvent mixture) can evaporate therefrom ing a line beyond but close to the said groove, whereby re is formed a new origin of collected material to be arated or identified, free from debris, after which the te carrying the said collected material is subjected to chromatographic operation proper, using the same a different solvent, under conditions such that subntial evaporation of the solvent is prevented.

Figure 2:
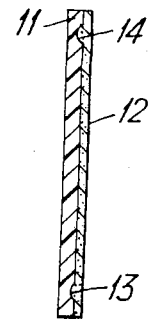

This technique involves carrying out the separation of ntification in two distinct stages. The first stage can be ried out by positioning the plate, carrying the material be separated or identified, vertically, or at least at a derately small angle to the vertical, preferably not re than 25° or 30°, with one edge immersed in the eloping solvent and the whole of the adjacent groove ve its surface. For a short distance above the groove, 0.5–2 cm., the plate is in an atmosphere which is stantially saturated with the vapour of the solvent, above this point solvent can evaporate freely. Coniently the solvent is contained in a dish provided at the uired height with a cover containing a slit through ich the plate can pass. Preferably the width of such is not more than twice the thickness of the te, though it should be sufficient to allow a loose fit hout damaging the absorption layer. The length of slit is preferably only slightly greater than the width of plate. The effect of this arrangement is to form, at the l at which the solvent evaporates, a new origin having form of a straight line at a uniform level, at which mobile component or components collect, and which ndisturbed or unobstructed by "debris," which has ained in the groove and so been kept away from the / origin.

he second stage consists in carrying out a convenal thin layer chromatographic process, with the same different solvent, but of course under conditions such the solvent does not evaporate (e.g. in a closed tank). lthough, as has been said, this technique is particuy valuable in conjunction with the use of the plates he invention, it is also advantageous even when contional plates are used, and whether or not the solution tains substantial amounts of "debris."

he solvent or solvents used in the process of the intion will be chosen, according to known principles, ing regard to the composition of the starting mixture. en the two stage process described above is employed, desirable to use in the first stage a solvent of relaly low boiling point, which will evaporate quickly; if a volatile solvent is more desirable in the second stage, an be used.

he invention is illustrated in the accompanying drawin which;

IG. 1 is a plan view of a thin layer chromatographic e in accordance with the invention, IG. 2 is a cross-section along the line 2—2 of FIG. nd IG. 3 is a cross-sectional view of apparatus set up carrying out the first stage in the two-stage process cribed above.

eferring now to FIGS. 1 and 2 of the drawing, a thin r chromatographic plate 10 comprises a base plate carrying an absorbent layer 12, for example of silica mixed with calcium sulphate as a binder. (For the sake larity the thickness of the absorbent layer 12 is exagted in the drawing.) The base plate is provided with a ove 13 near one end, and a similar groove 14 near other. These grooves are cylindrical in outline 1 cm. e and with a maximum depth of 2 mm., and are ced (centre line) about 2 cm. from their respective ends. The second groove 14 can if desired be dispensed with.

The base plate 11 may be of glass or may be moulded from a synthetic resin, e.g. a urea-formaldehyde or phenol-formaldehyde resin, or a modified resin of either of these types. The coating can be applied to it in any conventional way.

Figure 3:
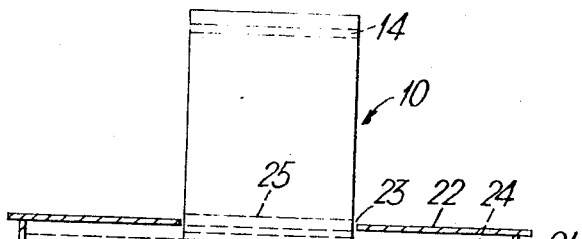

The apparatus illustrated in FIG. 3 comprises a dish 21 provided with a cover 22 in which is a slit 23 whose length is slightly greater than the width of a chromatographic plate 10, and whose width is 1½ times to twice the thickness of the plate. The broken line 24 indicates the operating level of the solvent to be applied which is below the level of the groove 13 in the base plate. The broken line 25 shows the approximate level of the new origin which is formed from the mobile component or components as described above.

If desired this apparatus can be rendered more sophisticated, e.g. by providing means whereby fresh solvent can be fed to the dish 21 without interrupting the process, and/or means for collecting solvent vapour given off in the formation of the new origin, and for assisting rapid evaporation of the solvent. Such collecting means (not shown in the drawing), can be of any suitable type; for example it may comprise a vertically opening hood or the like on the coated side, or on both sides, of the plate, and extending across the width of the plate, to which suction can be applied. Alternatively the evaporation of the solvent can be accelerated by blowing cool or warm air or other gas against the coated surface, or tangentially across it.

While the invention is applicable to the treatment of many different solutions, one important application is in the investigation of solutions obtained by mecerating plant or animal materials with a view to determining the nature or amount of pesticide or herbicide residues therein. The initial solutions can first be freed from insoluble matter, as by centrifuging or filtering, and then applied to the chromatographic plate, usually along the line of the groove (or the lower groove).

Although in theory an effect similar to that provided by the grooves could be obtained in the converse manner, by providing a protuberance on the absorbent layer, this is less convenient, and also much less satisfactory since such protuberances have been found to lack the required mechanical strength. The use of a wedge shaped absorption layer of diminishing thickness is less economical in absorbing material, and is much less effective in collecting the "debris" and removing it from the area of operations. Moreover, a wedge shaped layer leads to elongated spots which are very undesirable in chromatographic separations since overlap of components is more likely to occur.

I claim:

1. A thin layer chromatographic plate comprising a base plate carrying a layer of an absorbent, wherein the base plate is provided, near at least one of its ends, with a transverse groove which has a curved and wholly concave peripheral surface, and which is filled by the absorbent so that the exposed surface of the absorbent layer is in a plane parallel to that of the remainder of the surface of the base plate.

2. A chromatographic plate according to claim 1, wherein the base plate is provided with two such grooves, one near each end of the plate.

3. A chromatographic plate according to claim 1 and having one groove only wherein the groove is 0.5–1.5 cm. wide and has a maximum depth of 1–3 mm.

4. A chromatographic plate according to claim 2, wherein the grooves are 0.5–1.5 cm. wide and have a maximum depth of 1–3 mm.

5. A chromatographic plate according to claim 1, wherein the base plate is moulded from a synthetic resin.

6. A chromatogarphic plate according to claim 1, wherein the base plate is of glass.

7. A chromatographic plate according to claim 1, wherein the absorbent layer comprises silica gel and calcium sulphate as binder.

8. A method of chromatographically separating or identifying at least one component in a solution containing also material which is substantially immobile on a chromatographic plate, which comprises applying the solution to a thin layer chromatographic plate comprising a base plate carrying a layer of absorbent and provided, near one of its ends, with a transverse groove which has a curved and wholly concave peripheral surface, and which is filled by the absorbent so that the exposed surface of the absorbent layer is in a plane parallel to that of the surface of the remainder of the base plate, the solution being applied to said groove, and a solvent is caused to travel along the plate from a line between the said groove and the adjacent end of the plate, both inclusive.

9. A method according to claim 8, wherein the plate is first held under conditions such that the applied solvent can evaporate therefrom along a line beyond but close to the groove, whereby there is formed a new origin of collected material to be separated or identified, after which the plate carrying the said collected material is subjected to a chromatographic operation under conditions such that substantial evaporation of the solvent used therein is prevented.

10. A method according to claim 9, wherein the plate contains a groove at each end and the chromatographic process is continued until a substantial quantity of solvent has entered the groove remote from the origin.

11. A method according to claim 9, wherein biological material selected from the group which consists of macerated animal and plant residues is treated.

12. A method according to claim 8, wherein the plate contains a groove at each end and the chromatographic process is continued until a substantial quantity of solvent has entered the groove remote from the origin.

13. A method according to claim 8, wherein biological material selected from the group which consists of macerated animal and plant residues is treated.

14. A method of chromatographically separating or identifying at least one component in a solution, which comprises applying the solution to a chromatographic plate wherein the base plate is provided near its end remote from the origin with a transverse groove which has a curved and wholly concave peripheral surface, and which is filled by an absorbent so that the exposed surface of the absorbent layer is in a plane parallel to that of the remainder of the surface of the brass plate, and the chromatographic process is continued until a substantial quantity of solvent has entered the said groove.

References Cited

UNITED STATES PATENTS 2,723,756 11/1955 Miller et al. _____ 210—198 X
3,327,857 6/1967 Kopp _____ 210—198

J. L. DeCESARE, Primary Examiner

U.S. Cl. X.R.

210—198